Figure 1:
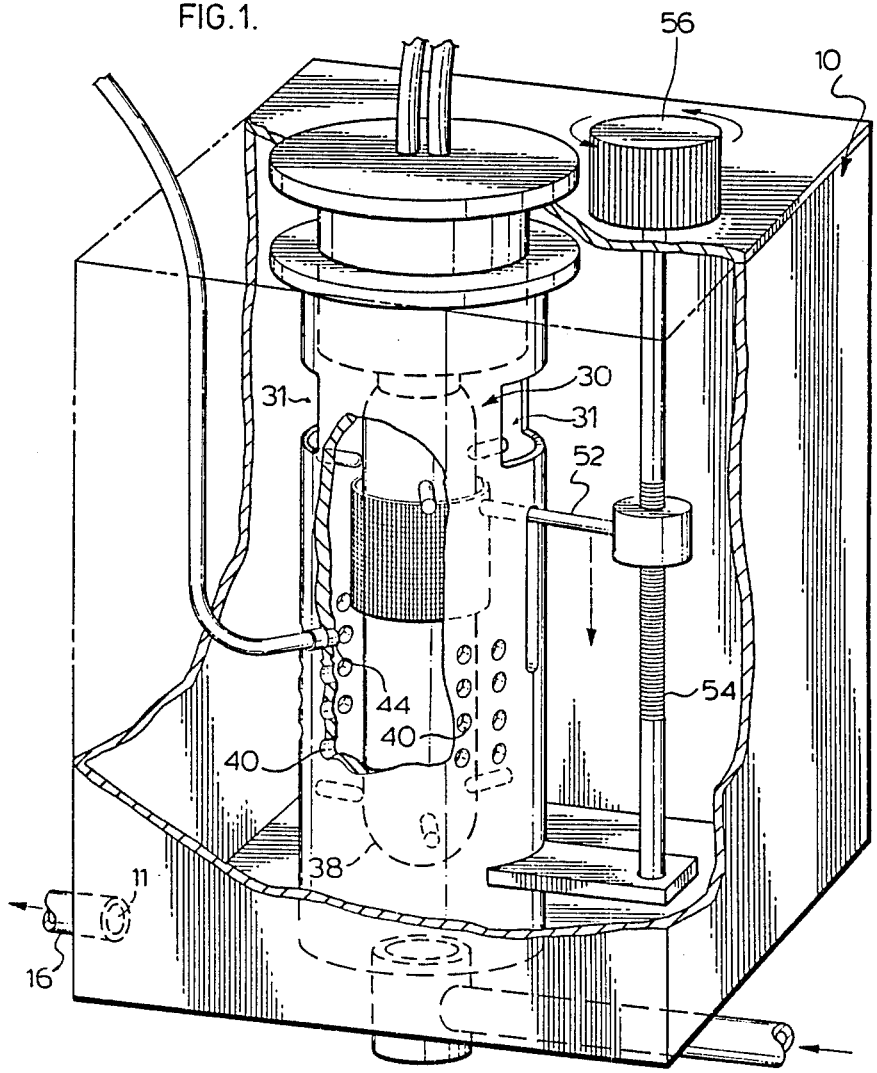

United States Patent [19]
Yazdani et al.

[11] Patent Number: 4,945,457
[45] Date of Patent: Jul. 31, 1990

[54] COOL LIGHT SOURCE FOR OPTIC FIBRES

[75] Inventors: Armand Yazdani, Toronto; Morris Anidjar, Mississauga, both of Canada

[73] Assignee: Nei Canada Limited, Rexdale, Canada

[21] Appl. No.: 298,923

[22] Filed: Jan. 23, 1989

[51] Int. Cl.$^5$ .............................................. F21V 33/00
[52] U.S. Cl. ...................................... 362/101; 362/32; 362/294; 362/96
[58] Field of Search ................. 362/101, 32, 294, 264, 362/373, 96

[56] References Cited

U.S. PATENT DOCUMENTS

| | | | |
|---|---|---|---|
| 4,025,779 | 5/1977 | Ahroni | 362/32 |
| 4,103,322 | 7/1978 | Thompson | 362/101 |
| 4,363,080 | 12/1982 | Sylvester | 362/101 |
| 4,380,791 | 4/1983 | Nishizawa | 362/32 |
| 4,509,104 | 4/1985 | Suzuki et al. | 362/32 |
| 4,564,889 | 1/1986 | Bolson | 362/96 |
| 4,740,870 | 4/1988 | Moore et al. | 362/32 |
| 4,814,948 | 3/1989 | Hasegawa | 362/32 |

*Primary Examiner*—Stephen F. Husar
*Assistant Examiner*—D. M. Cox

[57] ABSTRACT

A light source in a transparent envelope is contained in a sleeve which mounts the light input ends of optic fibres. Liquid coolant is caused to flow between the envelope and the fibres and is then cooled for recirculation.

10 Claims, 5 Drawing Sheets

COOL LIGHT SOURCE FOR OPTIC FIBRES

This invention relates to means for coupling a light source to optical fibres to provide illumination for display arrays.

The display arrays with which the invention is concerned are usually but not necessarily arranged in rows and columns and have an ON and OFF state. Optical fibres are suitable for use in such displays, see, for example, French Patent Application No. 81,22486 published June 3, 1983 under publication number 2,517,445 and standing in the name of World Acrilux S.A. showing fibres having their light input ends receiving light from a lamp source. Usually the light path from the lamp to the light input end of the fibre has been through air. The difference in index of refraction between glass and air at the lamp-air interface and between air and the fibre at the corresponding interface creates reflection losses which reduce the light provided along the fibre path. Since the amount of light from the lamp impinging upon the fibre, varies inversely as the distance between the fibre ends and the lamp, consideration is given to moving the fibre ends closer to the lamp to compensate for reflective losses. However the heat of the lamp in air (of the order of 300° C., varying widely with the lamp, at the outside of the envelope) will limit the proximity of the fibre ends. Although glass fibres may be placed in much closer proximity to the lamp than plastic fibres, glass fibres are difficult to work with and are expensive so that this invention is principally concerned with potential use of synthetic fibres which are extremely heat sensitive (acrylic for example, will change its operating and physical characteristics above its operating temperature of 75° C.

It is therefore an object of this invention to provide a liquid transparent medium between the fibre optic input ends and the lamp envelope, the liquid having an index of refraction much closer to that of the lamp envelope and that of the fibre than air and is at least as great as that of water. In this way the reflective losses are reduced at both the lamp envelope—liquid and at the liquid—fibre interfaces. Thus the spacing between the fibre and the lamp envelope may be longer while producing same light intensity in the fibre using the coupling medium. Conversely the wattage of the lamp can be decreased with cooling of the lamp envelope for a given spacing between envelope and fibre end. The use of the liquid medium reduces the critical tolerance of the polishing.

It is an object of the invention to provide the liquid medium as referred to in the preceding paragraph where the liquid is caused to flow between the fibres and the lamp envelope. Liquid exiting from between such fibre ends and the envelope is cooled in a suitable manner and the cooled liquid recirculated between fibres and lamp. The cooling obviously reduces the necessary distance between the plastic fibres and the lamp envelope and cools both the outside of the lamp envelope and the fibre ends while the more closely matching index of the medium reduces the reflective losses. The corollary of both the above reductions is that the wattage of the lamps may be made lower than that required for an air environment for a given envelope-fibre spacing because of the reduced reflective losses or the reduced fibre - envelope spacing, or both.

The liquid medium, in addition to providing the nearer index match, should have the following qualities: transparency, a reasonable specific heat to act as a heat transfer medium, to be inert to the degree that it does not react with lamp, fibres or its environs during its cycle. The liquid is preferably insulating to avoid any risks of shock when in the vicinity of the electrically activated lamp or other areas. The flash point must be higher than the temperature encountered by the fluid in operation. The medium must be liquid within the operating range and the pour point must be below the lowest operating temperature encountered.

As examples only some approximate typical values for preferred components are

---

Index of Refraction of lamp* envelope—about 1.55
Exterior temperature of lamp* envelope, in air, about 300° C.
Index of Refraction of acrylic fibre—about 1.49
*(sodium discharge arc lamp)
Creep temperature of acrylic fibre—about 75° C.
Index of Refraction of water—about 1.33
Index of Refraction of silicone—about 1.4 liquid
Index of Refraction of air—about 1.0

---

It is an object of preferred facet of the invention, previously discussed, to provide: an arc lamp having a cylindrical envelope for acting as the light source, a sleeve for surrounding said envelope at a predetermined spacing, an array of apertures in said sleeve radially directed inwardly, fibres mounted in said apertures with ends facing the lamp envelope to receive the lamp radiation.

The fibres mounted in said apertures may be single fibres or bundles. Means are provided to determine the spacing of the inward end of the fibre relative to the cylinder and hence to the lamp. A tank is provided for the preferred liquid medium—here silicone liquid with which the cooling and optic matching is to be achieved. The sleeve is connected to one wall of the tank to surround a port therein. A conduit is provided along which the silicone liquid is pumped out said port; the sleeve, having apertures filled with fibre or fibre bundle ends, forms a continuation of the conduct, so that the coolant medium runs between the fibre ends and the lamp envelope cooling the fibre ends, and by absorbing heat in passage, carrying it off. After exiting the sleeve, the liquid enters the main body of the tank. The liquid in the tank is then carried to cooling means, preferably a radiator, and after cooling, it is recirculated to the tank by the pump. The radiator cooling the liquid is the preferred means of removing heat from the bulb. However other heat exchange means of cooling the liquid may be used.

It will be noted that the tank must be large enough to house lamp and sleeve and an extent of each of the fibres, projecting outside the sleeve. It should also be noted that if the fibres were sealed in the apertures so that liquid could not escape through the apertures, about the fibres, the tank could be dispensed with and the sleeve used as part of the conduit which would then carry liquid from the radiator through the sleeve and back to the radiator (with a pump included in such conduit circuit). However, in practice, it is found easier and less expensive to use the tank and avoid the precision and expense of sealing a sleeve aperture about each fibre.

In drawings which illustrate a preferred embodiment of the invention.

Figure 2:
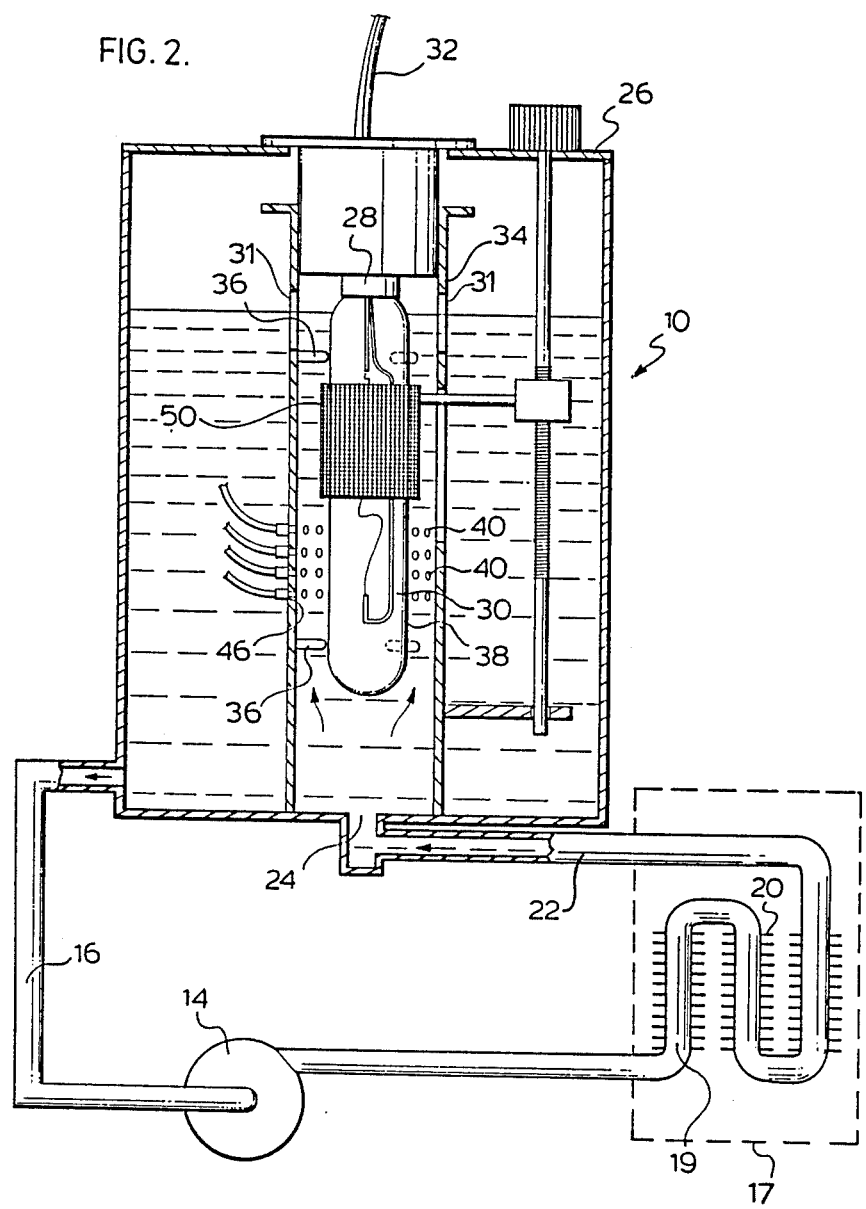
Figure 3:
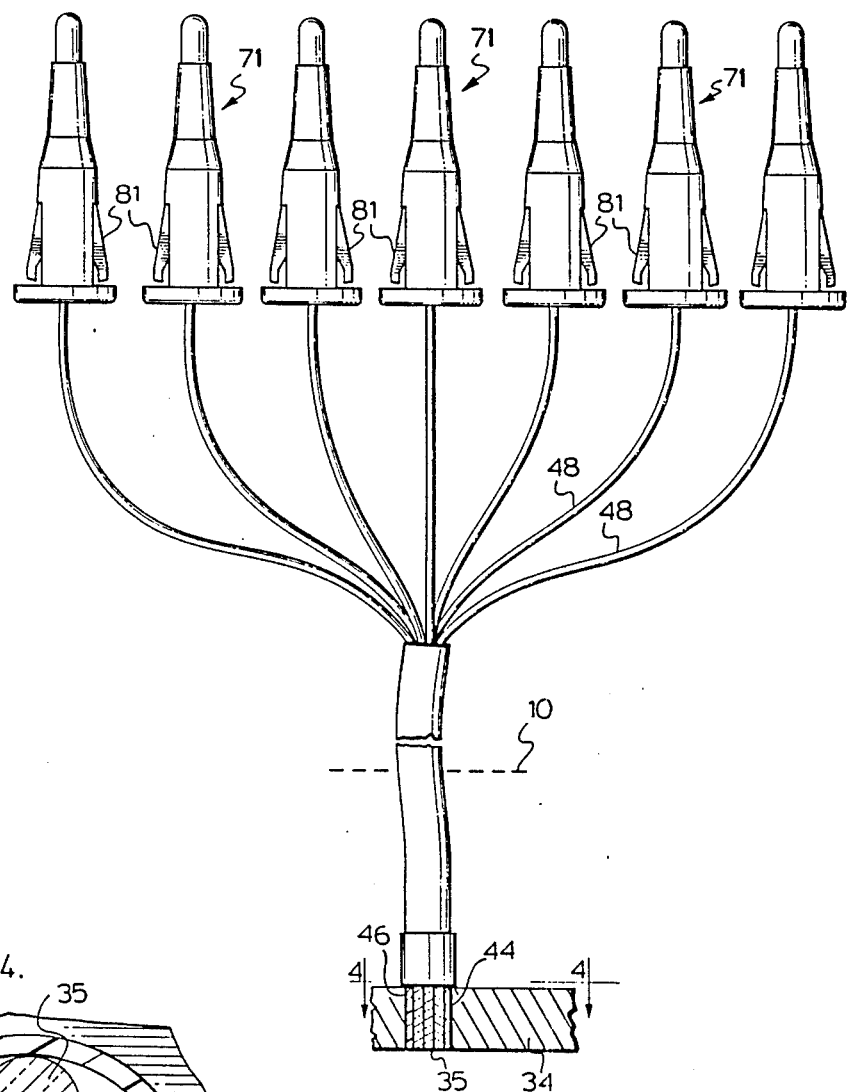
Figure 4:
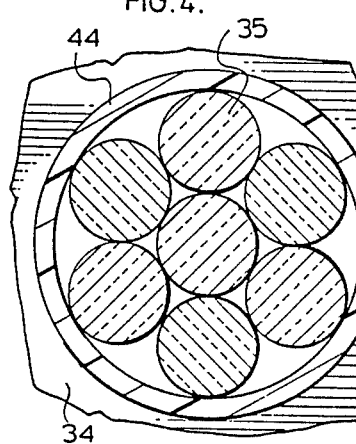
Figure 5:
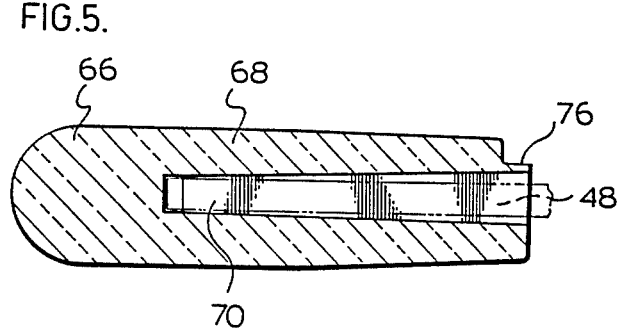
Figure 6:
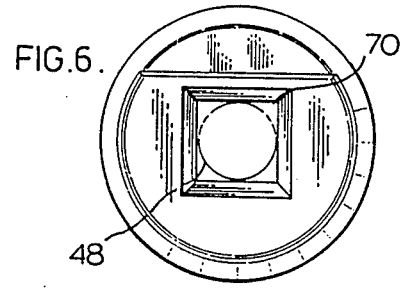
Figure 7:
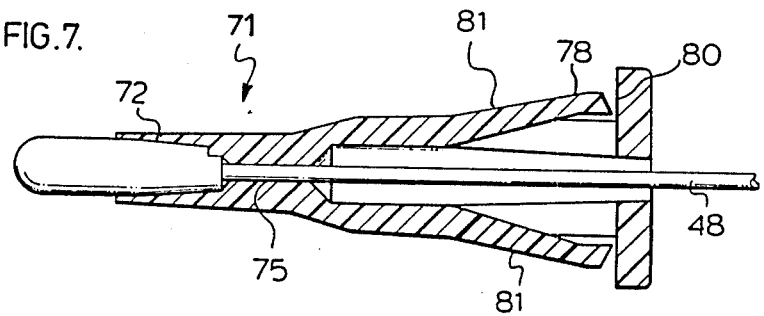
Figure 8:
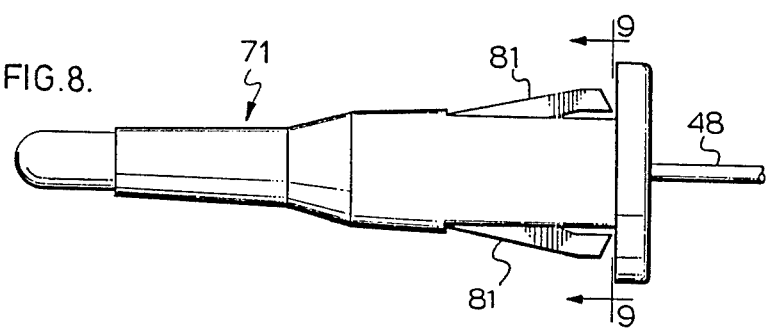
Figure 9:
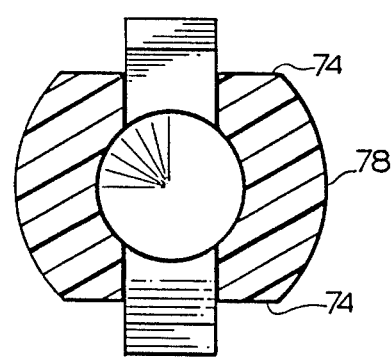
Figure 10:
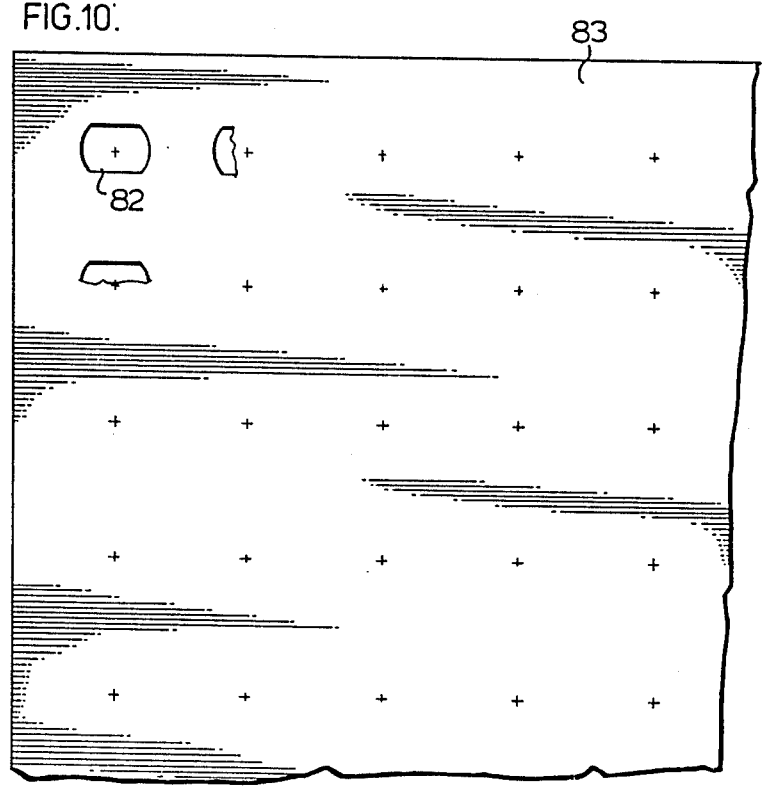

In the drawings:

FIG. 1 is a perspective, partially schematic view of the lamp environment,

FIG. 2 shows a vertical section of the lamp environment and a schematic indication of the remainder of the liquid circuit, FIG. 3 is a partially schematic view showing the fibre optic path, FIG. 4 is an enlarged view of a fibre optic bundle, FIG. 5 is a vertical section of a fibre optic lens and sleeve, FIG. 6 is an enlarged (light input) end view of the fibre optic lens and sleeve, FIG. 7 is a vertical section of the lens holder, FIG. 8 is a side view of the lens holder, FIG. 9 is a section along 9—9 of FIG. 8, FIG. 10 is a portion of a display board.

In the drawing, the cooling system comprises a tank 10 having an outlet port 11 to conduit 16 extending to the input of a centrifugal pump 14 whose output is connected to the radiator 17. The radiator 17, may be of any suitable form to perform the cooling required. As shown the preferred form of the radiator comprises the sinuous conduit 19 with cooling fins 20 as shown. The output end of the radiator is connected along conduit 22 to inlet port 24 of the container. The radiator may be replaced by any other suitable heat exchanger for cooling the liquid.

Mounting means 26 is affixed to the tank 10 and comprises a platform on which the socket assembly 28 for the lamp 30 is mounted. The lamp 30 is screwed into the socket 28 and the socket 28 is supplied with power along leads 32 from a source, not shown. The platform locates the socket so that the preferably cylindrical lamp extends longitudinally downwardly in alignment with the tank inlet port 24. Fitted about the lamp is sleeve 34 with spacers 36 to control its spacing from the lamp envelope 38. The sleeve 34 is preferably sealed to the bottom of the tank about port 24 so that cooled liquid entering the tank is directed upwardly by the sleeve walls to pass between the lamp envelope 38 and the optic fibre ends 35 which are located approximately flush with the inner surface of the sleeve. Exit apertures 31 near the top of the sleeve allow escape of the liquid from the sleeve. There are a number of lamps whose performance is suitable for use with the invention. I prefer to use a high pressure sodium electric arc lamp 30 in which the arc is generated by vaporized sodium. The colour of the generated light is usually described as golden white and the lamp radiation is most intense in the wavelengths 550-650 n.m. Such lamps come in a variety of shapes, length, wattage and the lamp will be selected most suitable for a particular application. The shape of the lamp envelope will preferably be that of a extended cylinder since this facilitates the use of a cylindrical sleeve. With each lamp is associated a ballast which is basically an electric drive circuit. Some lamps have special ballasts ( sometimes known as 'dimming ballasts' which give the possibility of automatic intensity modulation which is a useful feature with display systems).

The sleeve is provided with an array of apertures 40 as shown. These will usually be in a rectangular array as represented on a planar development of the cylindrical surface. Each aperture 40 is designed to receive one fibre or bundle of fibres with its ends inwardly toward the lamp. A ferrule shank 44 surrounds the end of the fibre or fibre bundle and defines a shoulder 46 arranged to face inwardly relative to the sleeve. The fibre end or fibre bundle end in such ferrule is heat sealed to form a mirror finish approximately flush with the inner end of shank 44. The shank 44 is designed to make a close fit with the sleeve aperture and to be fastened in place by any desired means while its shoulder 46 acts as a stop and bears on the outside of the sleeve wall while the length of the shank 44 and fibres inwardly of the shoulder 46 sets the spacing of the inner fibre ends from the lamp and locates these approximately flush with the inner surface of the sleeve. It is noted that although it is preferred to have the fibre ends polished to a mirror finish normal to the longitudinal axis of the fibre, there is not a requirement that an optical finish be achieved and, it is one of the advantages of the invention, that the expense of providing such an optical finish may be avoided.

It is preferred that each ferrule will contain seven acrylic fibres 48 (with ends 35) in hexagonal arrangement as shown, in FIG. 4.

Dimmer means may be provided for the lamp. The lamp may be electronically dimmed by means not shown such as the dimmer ballast previously referred to. A mechanical dimmer may be provided in the form of a wire mesh screen 50 slidably moveable into and out of position between the sleeve and the lamp envelope and supported on arm 52 from spirally threaded rod 54 driven by knob 56. (Knob 56 may be replaced by a motor drive) Since all pixels are of similar brightness value in the usual array, the mechanical dimmer will usually be operated in only two positions. The mechanical dimmer may be used during the night or day in order to produce special effects and can therefore sometime assume intermediate positions.

The mechanical dimmer 50 is preferably constructed of stainless steel wire mesh. The dimmer may be designed to provide any desired degree of dimming. The sleeve spacers 36 must be located so as not to interfere with the desired range of movement of the dimmer.

The coolant liquid is preferably silicone fluid and I prefer to use liquid silicone known as Dow Corning 200 fluid available from Dow Corning Canada Inc., 6747 Campobello Road, Mississauga, Ontario, Canada, L5N 2M1. This fluid may be considered optically transparent, has a high flash point, and low pour point, a very high dielectric strength and an index or refraction of 1.399. It is non poisonous and non-reactive with the equipment it encounters. It has a specific heat of 0.379 cal/gm/C° at 25° C.

Any fluid of comparable qualities will be also suitable.

It is preferred to use a lamp of the following specification:

| | |
|---|---|
| Power | 400 Watts |
| Voltage | 100 volts |
| Mean Output Light | 42300 Lumens |
| Rated average life | 24,000 Hours |
| Bulb shape cylindrical | |

The synthetic optical fibres are preferably made of acrylic fibre using a fibre per pixel and having seven such fibres in hexagonal array in each ferrule 44 (FIG. 4). The index of refraction of the acrylic is approximately 1.49 and the fibre diameter would be 1.5 mm in the above (7 fibres per ferrule) arrangement. Such fibres typically allow an output beam cone making an angle of 30° to the fibre axis. In the preferred usage, the output fibres are fitted with a lens reducing the output cone beam angle to 15° to the fibre axis.

The sleeve is preferably made of stainless steel and has thickness equal to ferrule shank 44.

The fibre bundles are, at their output end, preferably split into seven individual fibres 48 one for each pixel in a display array. Each fibre is preferably coupled to a lens 66 made of the same acrylic and having the same index as the fibre.

The lenses 66 are preferably formed as a spherical lens. The lens is formed on a hollow sleeve 68 with a bore 70, the fibre extending from the end remote from the lens to a location suited to provide the desired 15° beam cone angle given the radius of the lens. The bore 70 is preferably made square in section as hereinafter noted. The individual fibres are dimensioned to make a firm fit with the medians of the square sides of the narrow end of bore 70 and are polished to have a mirror (not optical) finish at the exterior end. The bore 70 is provided with uncured epoxy before insertion of the fibre, so that when the epoxy cures it provides optical coupling of the fibre end to the lens since the index of the epoxy when cured is approximately 1.503, chosen to be close to that of the acrylic to reduce reflection losses. The cured epoxy also acts as an adhesive to attach the fibre to the sleeve. Any material with transparency and suitable index of refraction can be used to optically couple the fibres to the lens. However if, for example, silicone fluid was used for this purpose then a different method for attaching the fibre to the sleeve (and containing the silicone fluid) must be used.

The bore 70 for the fibre is preferably square to allow escape passages for the epoxy and prevent the risk of air entrapment at the end of the fibre when the fibre 48 is inserted since such entrapped air would detract from the optical coupling.

For attachment of individual fibres and lenses to an array, means are provided as shown in FIGS. 7-10. A mounting sleeve 71, of generally cylindrical shape is provided with a forward bore 72 to receive the lens, sleeve, a rearward bore to receive a fibre 48 and a communicating bore 75 therebetween to receive the fibre. The cylindrical cross section of the lens sleeve 68 is reduced at its rearward end to provide an opposed short flat surface 76 parallel to the intended insertion direction of the lens sleeve into the mounting sleeve. The mounting sleeve bore 72 is complementary in shape so that the lens is keyed against rotation relative to the sleeve. The mounting sleeve is provided with a shape having two opposed convex outward sides 78 and two opposed flat sides 74. The flat sides are broken to provide rearwardly outwardly diverging camming surfaces 81 on resilient diverging rearwardly extending tabs 78. Rearwardly of tabs 78 the mounting sleeve is provided with outwardly extending flange 80.

The output end of the optical path is constructed by pushing the fibre end through passage 75 to extend forwardly of sleeve 71. The lens sleeve bore 70 is then supplied with liquid epoxy and the fibre end attached thereto being inserted into lens sleeve 68 to the extent necessary to place its outer end in proper focal relationship with lens 66. With the fibre attached to lens sleeve 68 by the cured epoxy, the lens sleeve is then attached in bore 72 with a suitable adhesive.

The mounting sleeve 71 is used to attach the lens in its correct position in the display array. A display board may have any array but often will have a 7 by 5 rectangular array as partly shown at 83 in FIG. 10. The board, usually a metal plate, will be provided with apertures 82 designed to slidably receive and key to the mounting sleeve section formed by convexities 78 and flats 74. Thus each mounting sleeve, with fibre attached may be mounted in the desired pixel location by inserting the mounting sleeve from the rear through an aperture 82, moving tabs 78 inwardly until they pass forwardly through board 83 at which point they snap forwardly to fasten the mounting sleeve 71 and lens 66 in position.

It will be noted that lens 66 is keyed to mounting sleeve 71 which in turn is keyed to array board 83. This is particularly advantageous when the lens 66 is not spherical but cylindrical or with some other optic qualities assymmetrical about the lens axis.

The pixels in the array will be selectively blanked by means not shown to provide the information to the viewer. This will most commonly be provided by individual (to each pixel) selected masks for interruptor radiation from selected pixels to the viewer. An example is shown in French Patent application No. 81,22486 previously referred to.

In operation with the lamp on and the dimmer in operation, or not, the silicone liquid is pumped by pump 14 between the lamp envelope and the fibre ends. The liquid heated in passage exits from the tank along conduit 16 and is pumped by pump through the radiator for cooling. The cooled liquid returns from the radiator to pass upward through sleeve 34 completing the cycle. The heat exchange will maintain the temperature of the liquid and the outside of the lamp envelope and fibre tips to only 17° C. above ambient temperature for temperatures of up 55° C. Thus the coolant system, for ambient temperatures of up to 55° C. will maintain the fibres below their creep temperature of 75° C.

I claim:

1. Transmission source for synthetic optic fibres comprising:
   light source contained in a transparent envelope,
   sleeve surrounding said envelope,
   apertures in said sleeve directed inwardly toward said light source,
   synthetic optical fibres projecting through said apertures, to ends spaced from said envelope,
   means for causing liquid flow between said fibre ends and said envelope,
   such liquid being transparent, and non-reactive with its environs and having a refractive index at least as great as that of water,
   heat exchange means for cooling liquid existing from between said fibre ends and said envelope,
   means for returning liquid flow causing means.

2. Transmission source as claimed in claim 1 where said lamp envelope is cylindrical and said sleeve is approximately coaxial therewith and provided with means for spacing said sleeve from said envelope.

3. Transmission source as claimed in claim 1 wherein mounting means surround a plurality of said fibres and cooperating means are provided on said sleeve and said mounting means for locating the inner ends of said mounting means relative to said sleeve whereby the fibre end spacing from said envelope may be controlled.

4. Transmission source as claimed in claim 2 wherein mounting means enclose a plurality of said fibres and cooperating means are provided on said sleeve and said mounting means for locating the inner ends of said mounting means relative to said sleeve whereby the fibre end spacing from said envelope may be controlled.

5. Transmission source as claimed in claim 1 wherein a liquid tank surrounds said sleeve,
   a liquid inlet port is provided in one wall of said tank, below the intended liquid level therein,
   one end of said sleeve being coupled to said one wall, surrounding said port whereby liquid entering said tank through said port passes through said sleeve.

6. Transmission source as claimed in claim 2 wherein a liquid tank surrounds said sleeve,
   a liquid inlet port is provided in one wall of said tank, below the intended liquid level therein,
   one end of said sleeve being coupled to said one wall, surrounding said port whereby liquid entering said tank through said port passes through said sleeve.

7. Transmission source as claimed in claim 1 wherein said fibre is acrylic.

8. Transmission source as claimed in claim 2 wherein said fibre is acrylic.

9. Transmission source as claimed in claim 1 wherein said liquid is silicone.

10. Transmission source as claimed in claim 2 wherein said liquid is silicone.

* * * * *